March 25, 1969 R. E. BOYER 3,434,687

CIRCUIT MODULE GUIDE AND RETAINING DEVICE

Filed Sept. 22, 1967 Sheet 1 of 2

INVENTOR

Ralph Edward Boyer

BY J. O. Tresansky

ATTORNEY

United States Patent Office 3,434,687
Patented Mar. 25, 1969

3,434,687
CIRCUIT MODULE GUIDE AND RETAINING DEVICE

Ralph E. Boyer, Pittsfield, Mass., assignor, by mesne assignments, to the United States of America as represented by the Secretary of the Navy Filed Sept. 22, 1967, Ser. No. 669,959
Int. Cl. F16b *2/00;* A47g *19/08;* H05k *1/00*
U.S. Cl. 248—361 5 Claims

ABSTRACT OF THE DISCLOSURE

A guide and retaining device for a circuit module wherein a guide block is fixedly secured wherever the module is desired. Two similarly shaped plates are slidably mounted above the guide block but are capable of being fixedly secured thereto. Each of the plates has a plurality of vertical ribs forming a vice-like mechanism which opens and closes around portions of the module as the plates are moved relative to each other. Flanges at the top of each vertical rib prevent vertical movement of the module.

*Background of the invention*

This invention relates generally to a guide and retaining device, and more particularly to a guide and retaining device for a circuit module or for a plurality of stacked circuit modules.

Several diverse arrangements have been heretofore proposed to provide guiding and retaining of a circuit module or of a plurality of circuit modules. Hereinafter the module or modules will be referred to in the singular although it must be understood that the guide and retaining devices to be discussed could be used with a plurality of thinner stacked modules having similar cross-sectional shapes. One such prior art device is that shown by U.S. Patent 2,752,692, issued to Wolfe. Another prior art device is shown in FIG. 1 in which a rectangular guide block 2 having a plurality of vertical slots 4 is affixed by any conventional means (not shown) to a plate member 6. A rectangular retainer plate 8 having a plurality of notches 10 along its edges is positioned above guide block 2. Retainer plate 8 also has two elongated slots 12 through which a pair of bolts 14 extend and engage internally threaded bores (not shown) in the guide block. In this manner the retainer plate is free to slide longitudinally in the direction of elongated slots 12 when bolts 14 are loosened but is fixedly secured with respect to the guide block when the bolts are tightened. As can be seen in the illustration, the notches 10 are so positioned along the edges of retainer plate 8 as to be in alignment with the vertical slots 4 in guide block 2; thus, when the retainer plate is in position illustrated, a module (not shown) having a plurality of internal ribs may be inserted so that the module ribs engage slots 4. After the module is inserted, the retainer plate is moved in the direction of arrow heads 16 and the bolts are tightened thereby locking the module in place. Although such a device has served its purpose, it has not proved entirely satisfactory under all conditions of service for a variety of reasons. First, in the manufacture of such a device, close tolerances are required since the vertical slots and notches necessarily must be as wide or wider than the corresponding ribs of the module. In order for the module to be easily inserted, the vertical slot widths are ordinarily excessively wide; this gap between the ribs and vertical slots leaves the module somewhat loose and quite subject to damage from shock and vibration in situ. Moreover, if a plurality of thin modules are used, as opposed to one, either each module must be inserted individually or they must be carefully stacked prior to insertion so that the ribs are precisely aligned since the vertical slot width closely approximates the width of the corresponding module rib.

*Summary of the invention*

Accordingly, an object of the present invention is the provision of a guide and retaining device.

Another object is to provide a guide and retaining device for a circuit module or for a plurality of stacked circuit modules.

A further object of the invention is the provision of a variable slot center line and slot width in a circuit module guide and retaining device.

Still another object is to provide a circuit module guide and retaining device which gives greater shock and vibration protection than existing devices.

Yet another object of the present invention is the provision of a circuit module guide and retaining device which do not require closely controlled tolerances and excessively wide slot widths.

A still further object is to provide a circuit module guide and retaining device in which a module may be inserted quickly and without damage to the module.

Briefly, in accordance with one embodiment of this invention, these and other objects are attained by providing variable width slots which may be opened substantially wider than the width of the corresponding module ribs and which may be thereafter closed so that the walls of the slot act as a vise against the module ribs. In addition means are provided to restrain the module from movement in the vertical direction.

*Brief description of the drawings*

A more complete appreciation of the invention and many of the attendant advantages thereof will be readily appreciated as the same becomes better understood by reference to the following detailed description when considered in connection with the accompanying drawings wherein.

*Description of the preferred embodiment*

Figure 2:
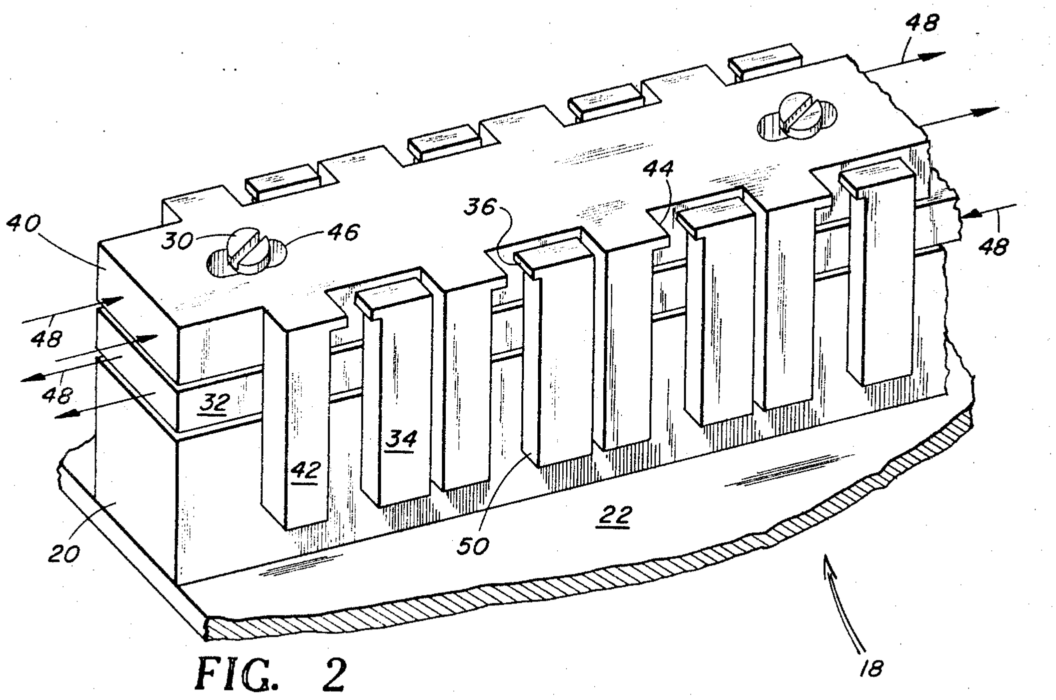
FIG. 2 is a perspective view of a preferred embodiment of the invention.
Figure 1:
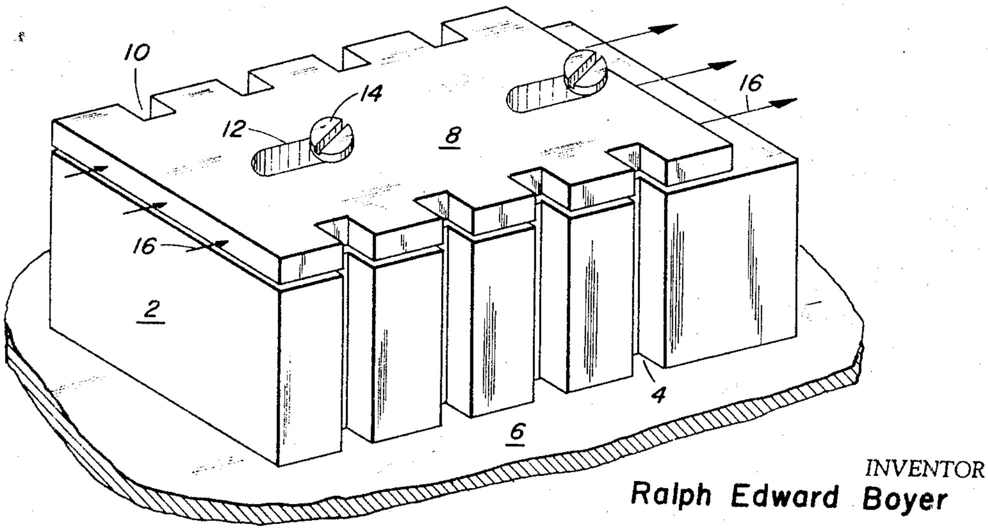
FIG. 1 PRIOR ART
FIG. 1 is a perspective view of a prior art circuit module guide and retaining device.
Figure 3:
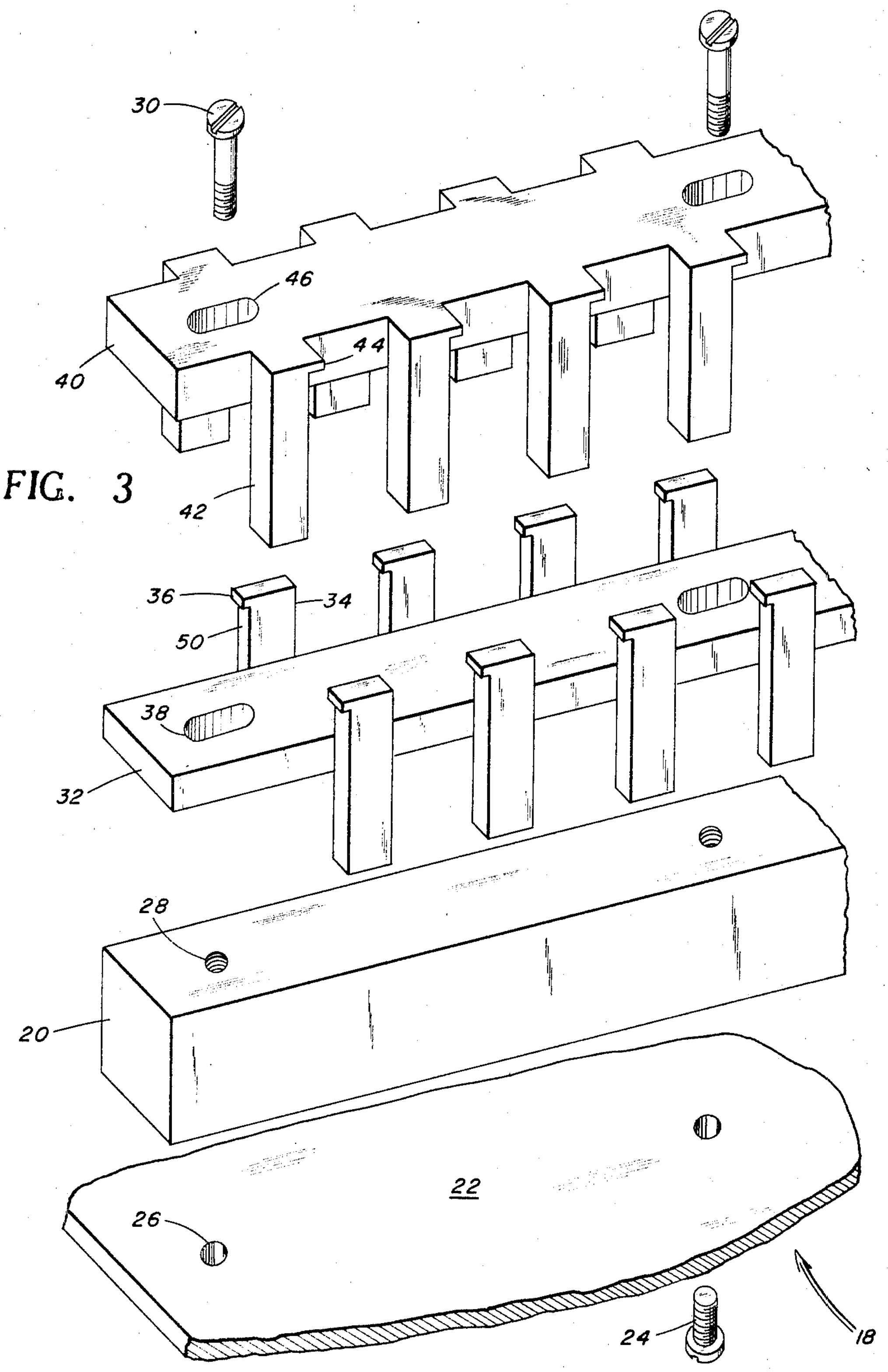
FIG. 3 is an exploded perspective view of the apparatus shown in FIG. 2.

Referring now to the drawings, wherein like reference characters designate like or corresponding parts throughout the several views, there is shown in FIGS. 2 and 3 a circuit module guide and retaining device 18 having a guide block 20 adapted to be fixedly secured to a plate member 22 by any conventional means such as bolts 24 which extend through bores 26 in plate member 22 and engage threaded bores (not shown) in the lower part of guide block 20. Guide block 20 also has a pair of threaded bores 28 in the upper part thereof adapted to mate with a pair of bolts 30.

Positioned above guide block 20, there is an inner cage member 32 having a plurality of vertical ribs 34, which may be integral therewith, spaced along the lateral edges thereof. At the top of each rib 34, there is a flange 36 extending in the same direction. A plurality of longitudinally extending slots 38 are positioned in the inner cage member 32 so as to be aligned with bolts 30 which pass therethrough.

Positioned above inner cage member 32, there is an outer cage member 40 having a plurality of vertical ribs 42, which may be integral therewith, spaced along the lateral edges thereof. At the top of each rib 42, there is a flange 44 extending in the opposite direction of flanges 36. A plurality of longitudinally extending slots 46 are positioned in the outer cage member 40 so as to be aligned with bolts 30 which pass therethrough.

In operation guide block 20 is bolted to plate member 22 so as to be relatively fixed thereto. It should be understood that plate member 22 forms no part of the invention but is rather a portion of whatever assembly to which it is desired to affix a circuit module. The inner cage member 32 is then positioned above guide block 20, and the outer cage member 40 is positioned above the inner cage member. Next, bolts 30 are inserted through slots 46 and 38 in the outer and inner cage members respectively and are threaded into bores 28 in guide block 20. With the bolts loosely engaged in bores 28, inner cage member 32 and outer cage member 40 are urged to the extreme left and right, respectively, as illustrated herein. The movement of the cage members, it should be noted, is limited by the extent of slots 38 and 46 or by the engagement of ribs 34 and 42. In this position while the gap between flanges 36 and 44 is greatest, a circuit module (not shown) having vertical ribs is inserted so that the module ribs are in the slots formed between adjacent pairs of ribs 34 and 42; the upper edge of the module rib will be below the flanges 44. Lastly the cage members are urged into the locked position by movement in the direction of arrowheads 48 until surfaces 50 of vertical ribs 34 and 42 press the module ribs in a vise-like grip; bolts 30 are finally tightened to secure the module in position.

Obviously, numerous modifications and variations of the present invention are possible in the light of the above teachings. For example, the guide and retaining device might comprise a unitary inner-cage-guide-block as opposed to the separate members shown herein. Furthermore, as previously indicated, the vertical ribs could advantageously be separable from the plate portion of the cage members but attachable thereto. Moreover, there need not be a flange on each vertical rib; it would be quite sufficient to have one flange on each pair of vertical ribs. In addition, it should be recognized that the features of this device are adaptable for use with other than circuit modules wherever it is desirable to guide and lock removable items in place. It is therefore to be understood that, within the scope of the appended claims, the invention may be practiced otherwise than as specifically described herein.

What is claimed as new and desired to be secured by Letters Patent of the United States is:

1. A guide and retaining device comprising guide block means having an upper surface and side surfaces;

first plate means slidably mounted with respect to said guide block means on the upper surface thereof, said first plate means having an upper surface and side surfaces, the upper surface of said first plate means being parallel to the upper surface of said guide block means, and the side surfaces of said first plate means forming a contiguous surface with the side surfaces of said guide block means; second plate means slidably mounted with respect to said first plate means on the upper surface thereof, said second plate means having side surfaces which form a contiguous surface with the side surfaces of said first plate means; a first plurality of rib means spacedly disposed on the side surfaces of said first plate means, each of said first rib means extending across the intersections of the side surfaces of the guide block means, first plate means, and second plate means; a second plurality of rib means spacedly disposed on the side surfaces of said second plate means, each of said second rib means extending across the intersections of the side surfaces of the guide block means, first plate means, and second plate means, said second plurality of rib means being positioned alternatively with respect to said first plurality of rib means;

flange means disposed at one extremity of at least one of said plurality of rib means; and means capable of fixedly securing said first and second plate means with respect to said guide block means.

2. The apparatus of claim 1 wherein said guide block means, first plate means, and second plate means are each elongated blocks having rectangular cross-sections.

3. The apparatus of claim 2 including means to constrain said first and second plate means to sliding movement in a linear direction.

4. The apparatus of claim 3 wherein said securing means comprises bolt means which may extend through elongate slots in said first and second plate means so as to engage a threaded bore in said guide block means.

5. The apparatus of claim 1 wherein said securing means comprises bolt means which may extend through said first and second plate means so as to engage a threaded bore in said guide block means.

References Cited

UNITED STATES PATENTS

| | | | |
|---|---|---|---|
| 2,746,110 | 5/1956 | Bedford | 248—361 XR |
| 2,953,253 | 9/1960 | Henderson et al. | 211—41 |
| 3,192,445 | 6/1965 | Evans et al. | |
| 3,380,016 | 4/1968 | Samson et al. | 339—174 |

JOHN PETO, *Primary Examiner.*

U.S. Cl. X.R.

211—41; 339—17